Feb. 17, 1942.         W. A. RAY                 2,273,375
                      THERMOSTAT
               Filed Feb. 24, 1939        3 Sheets-Sheet 1
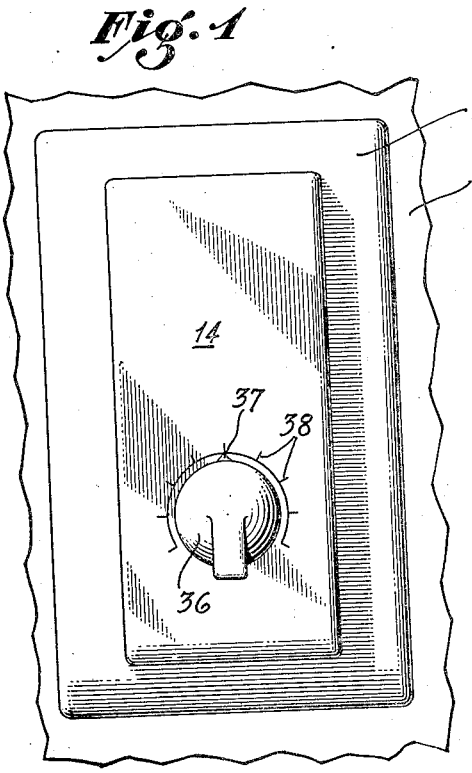
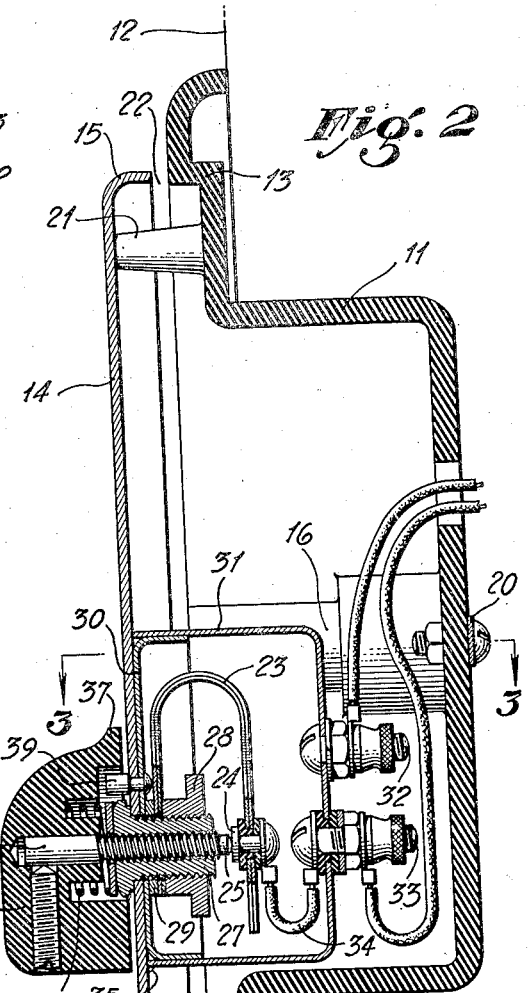
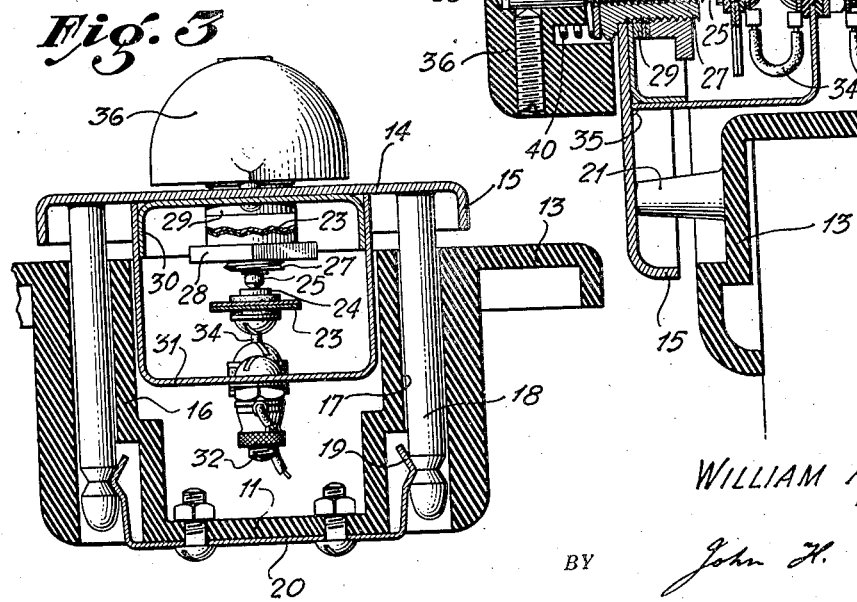
WILLIAM A. RAY,
INVENTOR
BY John H. Rouse.
ATTORNEY Feb. 17, 1942.  W. A. RAY  2,273,375
THERMOSTAT
Filed Feb. 24, 1939  3 Sheets-Sheet 2

WILLIAM A. RAY,
INVENTOR

BY John H. Rouse
ATTORNEY

Feb. 17, 1942.  W. A. RAY  2,273,375
THERMOSTAT
Filed Feb. 24, 1939  3 Sheets-Sheet 3
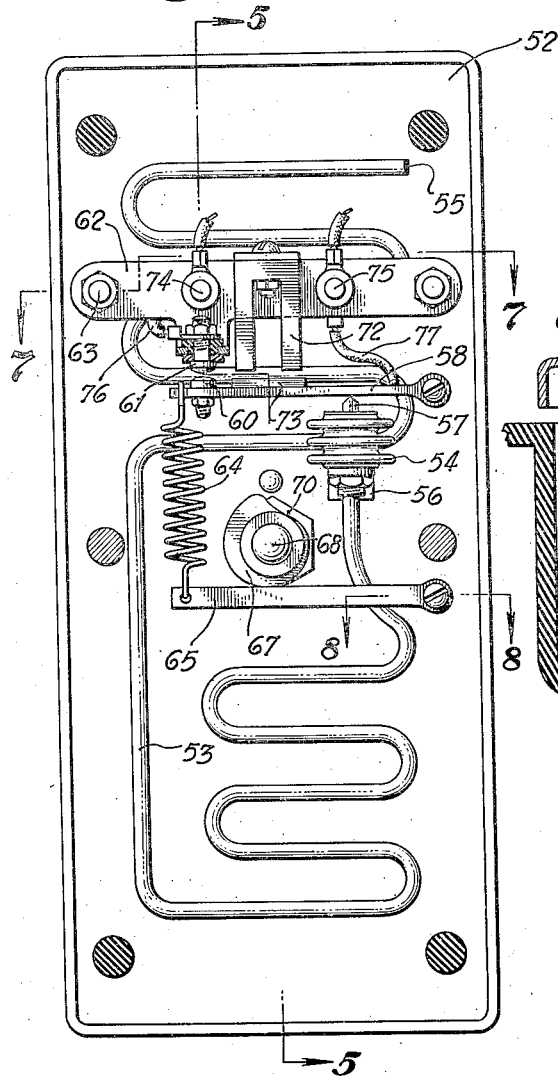
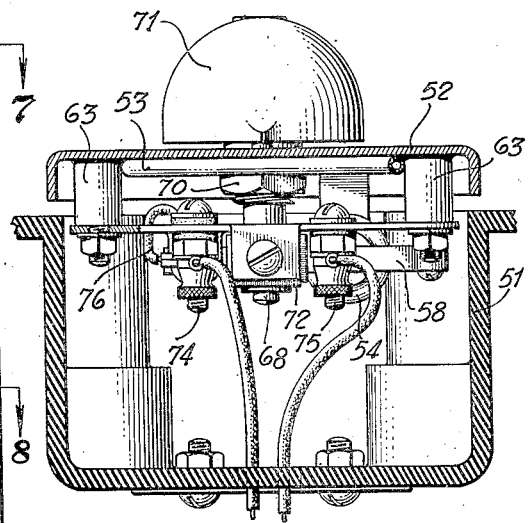
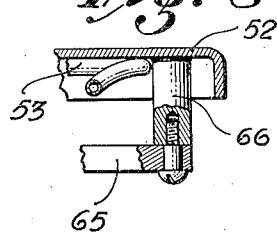
WILLIAM A. RAY,
INVENTOR
BY John H. Rouse.
ATTORNEY Patented Feb. 17, 1942

2,273,375

UNITED STATES PATENT OFFICE 2,273,375

THERMOSTAT

William A. Ray, Glendale, Calif.

Application February 24, 1939, Serial No. 258,253

4 Claims. (Cl. 297—3)

My present invention relates to thermostatic control devices and more particularly to those of the type commonly employed for controlling the operation of heating or cooling means for enclosed spaces or rooms.

Such devices usually comprise bi-metallic or fluid expansion thermostatic means which, upon variation in the temperature of the air of the room in a predetermined degree, act to open or close electric circuits or to operate fluid control pilot valves to control the operation of the heating or cooling means.

It is customary to mount the control device on a wall of the room, the temperature of which is to be controlled. In the early days of automatic heat control, bi-metallic switching members were mounted, uncovered, on the wall where they could effectively collect heat from the air. On account of the unsightliness of such devices, cases were soon provided to cover the members. These cases were apertured to permit free air circulation around the thermally actuated members and so necessarily protruded from the wall in a more or less unsightly manner.

It is therefore a particular object of my invention to provide a thermostatic control device which can be mounted substantially flush with the surface of a wall and yet will accurately respond to small changes in the temperature of the air of the room. This device may conveniently be mounted to cover a recess formed in the wall, such as is provided by a standard electrical fitting box.

Broadly, my invention comprehends a member for collecting heat from the air of a space and thermostatically actuated control means arranged so as to be responsive substantially only to the temperature of said member.

A particular object of my invention is the provision of a thermostatic control device which is receivable within a recess formed in a wall of a building and comprising a plate of high heat conductivity covering said recess and mounted substantially flush with the face of the wall and thermostatic means within the recess and secured in heat conducting relation to the inner surface of the plate so as to be responsive substantially only to the temperature thereof.

It is a further object to provide means for enclosing the thermostatic means whereby to thermally isolate the same from the wall and the adjacent air.

A further object is to provide a cover completely surrounding the thermostatic device and its associated contacts or other control means so as to shield the same from the harmful effect of dust and moisture.

Another object is to provide means for spacing and thermally insulating the heat collecting plate from the wall so that it is affected substantially only by the temperature of the air in the room.

Another object of my invention is the provision of thermostatically actuated control means comprising a heat collecting plate and fluid pressure actuated control means including an elongated tubular member secured throughout a substantial extended length thereof in intimate contact with a surface of said plate.

Other objects and advantages of my invention will be found in the description, the drawings and the appended claims.

For better understanding of my invention, reference may be had to the following detailed description and accompanying drawings, in which:

Figure 1 is a front elevation of a thermostat embodying my invention;

Figure 2 is an enlarged sectional view of the thermostat shown in Fig. 1;

Figure 3 is a section taken along the line 3—3 of Fig. 2 and turned through 90° to better illustrate structural features of the device;

Figure 6 is a section taken along the irregular line 6—6 of Fig. 5;

Figure 7 is a section taken along the irregular line 7—7 of Fig. 6; and

Figure 8 is a detail section taken along the line 8—8 of Fig. 6.

Figure 4:
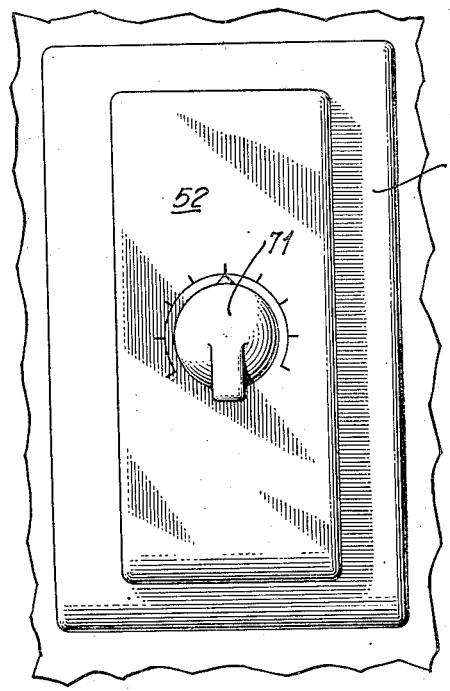
Figure 4 is a front elevation of a modified thermostat embodying my invention.

In the thermostat shown in Figs. 1, 2 and 3 of the drawings, the numeral 11 indicates a receptacle or case, preferably of molded insulating material such as "Bakelite," and adapted for mounting in a recess formed in a wall 12 of a room, with the outwardly flanged portions 13 of the case resting on the face of the wall. This case supports, by means to be hereinafter described, a plate member 14 comprising a substantially flat metal plate having inwardly turned peripheral portions 15. The case 11 is secured to the wall by screws passing through holes (not shown) in the flanged portion 13 and out of sight beneath the plate 14.

Boss portions 16, integrally molded in the case, are provided with bores 17 for the reception of mounting pins 18 which are secured to the inner surface of the plate 14 as by brazing. The inner end portions of these pins are grooved to cooperate with retaining clips 19 formed on the end portions of a spring metal strip 20. Bosses 21, molded integral with the flanged portions of the case, support the plate 14 in its assembled position in spaced relation to the case so that the air can reach a portion of the inner surface of the plate, and also so as to provide sufficient ventilation for the interior of the case through opening 22 that accumulation of dampness from the wall is prevented.

The thermostatically actuated control means comprises a U-shaped strip 23 of bi-metallic material insulatingly carrying on one end a contact element 24 cooperable with a relatively fixed contact 25 provided on the end of a rod 26 which is threadedly received in a member 27. The other end portion of the bimetallic strip is secured in heat conducting relation to the inner surface of plate 14 by a nut 28 threaded on the member 27, and with a metal washer 29 and metal cup-shaped member 30 between the bimetallic strip and the plate 14. Plate 14, member 30 and spacing washer 29 are preferably of brass so that good heat conduction results between the air of the room and the bi-metallic strip.

Tightly fitting the cup-shaped member 30 is a metal cover 31 which serves to protect the control device from dust and moisture and which carries a grounded terminal 32 and an insulated terminal 33 for connecting the device in an electric circuit. Insulated terminal 33 is connected by a flexible lead 34 with the insulated contact 24, and grounded terminal 32 is connected by the metal parts to the grounded contact 25. To ensure completeness of the grounded circuit, and also so as to seal the control device, the cover 31 may be soldered to the plate 14 as at 35.

Secured to the outer end portion of rod 26 is an adjusting knob 36 having a pointer 37 cooperating with indicia 38 on the front surface of the plate 14. A stop, limiting rotational movement of the knob, is provided by a pin 39. A compression spring 40 serves to take up any slackness between the threaded portion of rod 26 and member 27.

The thermostat shown in Figs. 1, 2 and 3 may be used as a "heating" thermostat for completing a circuit to electrically controlled heating means on fall in temperature of the air adjacent to plate 14 below the predetermined setting of the adjusting knob. In this case, the bi-metallic U-shaped strip is so arranged as to contract on cooling, thus closing the contacts. If it is desired to control cooling, instead of heating, means, the materials of which the strip is made, are arranged so that contraction occurs with rise in temperature.

The particular form of thermostat which has been described above, is intended for operation on very low voltage, such as, for example, is provided by a thermoelectric generating device, so that arcing at the contacts in operation is negligible. For use on higher voltage, it would be desirable to incorporate "snap-action" means such as are well known in the art, but which form no part of my invention.

Figure 5:
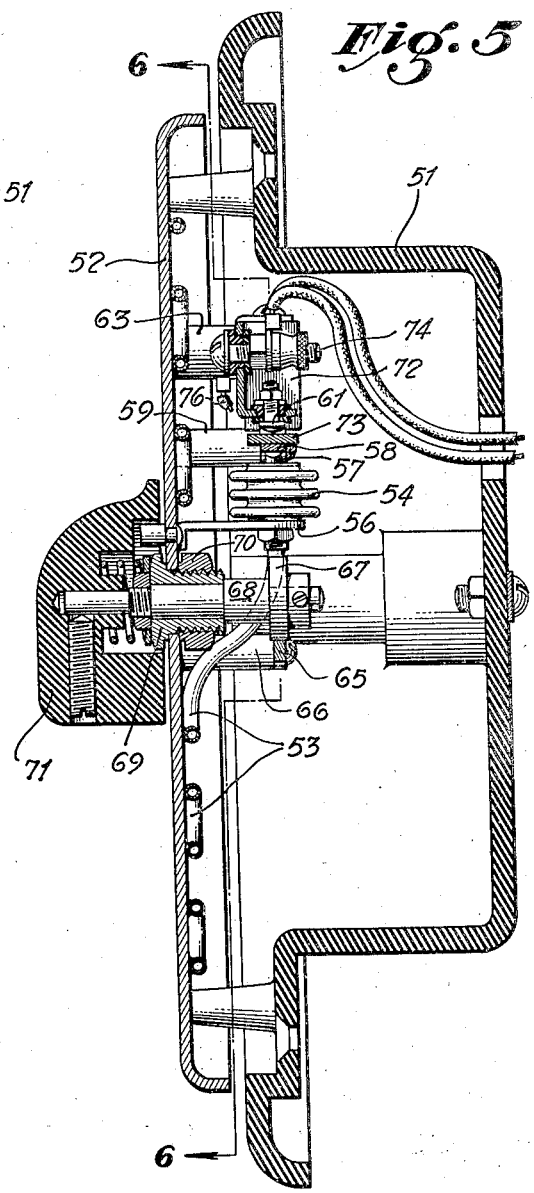
Figure 5 is an enlarged sectional view of the thermostat shown in Fig. 4 and taken along the irregular line 5—5 of Fig. 6.

Referring now to Figs. 4–8 of the drawings, in which I have shown a modified form of thermostat embodying my invention, the numeral 51 indicates a case substantially identical to, and for the same general purposes as, the case shown at 11 in Figs. 1–3. A metal plate-like member 52 is secured to the case 51 by means such as were described for securing plate 14 to case 11, but which are not completely shown in Figs. 4–8.

Thermostatically actuated control means comprise an elongated tubular member 53 secured in intimate contact with the inner surface of plate 52, as by solder, throughout a substantial extended length and communicating at one end with an expansible-contractible bellows member 54. The other end 55 of the tubular member is sealed. The bellows member is supported by a bracket 56 brazed to the inner surface of the plate 52.

Cooperable with a wedge-shaped member 57, carried by the head of bellows member 54, is an arm 58, pivotally supported by a stud 59 brazed to the plate, carrying a contact element 60. Cooperable with contact 60 is a relatively fixed contact 61, insulatingly supported by an up-turned portion of a bracket 62 which is supported by studs 63 brazed to the plate.

The arm 58 is biased downwardly by a contractile spring 64 which is connected at its lower end to an arm 65, pivotally supported by a stud 66 brazed to the plate. Cooperating with arm 65, so as to vary the tension on the spring 64, is a cam 67 secured to a shaft 68 supported by a bushing 69 secured in plate 52 by a nut 70. Secured to the outer end portion of shaft 68 is an adjusting and indicating knob 71.

The tubular member 53 and the bellows member 54 contain some volatile fluid which is partly in a vaporous state at or about the temperature at which it is desirable to maintain a room. The position of the lever 58 is determined by the pressure existing in the system and so, on rise of temperature in the system, it is moved to bring contacts 60 and 61 together to close an electrical circuit. The temperature at which this takes place can be changed by varying the tension of spring 64 by rotation of the knob 71.

It is to be noted that this thermostat is of the "cooling" type and is adapted to complete a circuit to electrically controlled cooling means on rise of temperature. However, it is obvious that, by a different arrangement of the operating members, a thermostat of the "heating" type can be produced.

Snap-action means for the thermostat are provided by a permanent magnet 72, mounted on an up-turned portion of the bracket 62, cooperating with a soft iron member 73 secured to arm 58. As the arm is moved upward by rise in temperature and resultant increase of pressure in the fluid system and before the contacts are thus brought together, the magnetic force acts to snap them in contact. On decrease of pressure in the system, the magnetic force acts to hold the contacts together until it is finally overcome by the force of spring 64 when the contacts are suddenly opened. Arcing at the contacts is thus minimized.

Terminals 74 and 75 are provided for external connection of the thermostat in a circuit. Terminal 74, insulatingly mounted in bracket 62, is connected by wire 76 to contact 61 and grounded terminal 75, which is directly mounted in the bracket, is connected by flexible lead 77 to arm 58 by solder so as to avoid the possibility of poor conduction through the pivotal support 59.

For the sake of clarity, in the modified form of thermostat just described, no cover has been shown for protecting the device from dust and moisture. However, it is obvious that such may be provided without in any way affecting the operation of the device as the plate 52 serves to conduct heat from the air adjacent to it directly to the fluid system member 53 which is in intimate contact with the inner surface of the plate.

If it is desired to mount the thermostat in an outside wall of a building for "weather compensated" modulation of a heating control system, the use of dirt and moisture protecting covers is obviously necessary.

In both forms of thermostats which I have described, the cases 11 and 51 serve to thermally insulate the devices from the wall so that they are little affected by the temperature thereof. When a protective cover for the thermostatic means is provided, it serves to additionally thermally isolate said means from the wall and from the air in the recess on account of the "dead" air contained in the cover.

While it has been found desirable to provide an opening between the peripheral portions of the plate and the case so as to additionally insulate the plate from the wall and also so as to present a larger surface area of the plate to the atmosphere, this is not an essential feature of my invention. Under some conditions, the plate may be mounted directly on the case or wall when the device will still accurately respond to change in temperature of the adjacent atmosphere.

While the device of my invention is especially adapted for mounting in a recess of a wall, it is obvious that it also can be mounted directly on the face of a wall and still retain features of my invention.

It is obvious that modifications may be made in the embodiments of my invention which I have shown and described herein by way of illustration without departing from the spirit of my invention. I intend, therefore, that my invention be limited only by the scope of the appended claims.

I claim as my invention:

1. In a thermostat: a member made from heat insulating material and adapted to be supported by the aid of a wall; a plate overlying said member and made from material having good heat-conducting properties; a condition-controlling temperature responsive element supported by said plate and between the member and the plate; said plate having an edge inwardly directed toward said member and spaced therefrom, the space between the edge and the member forming a continuous opening clear around said edge; and means forming small contact areas spaced inwardly from said edge for maintaining said plate in said spaced relation; said plate and said member forming a casing for the accommodation of the temperature responsive element; the space between the edge of the plate and the member being small so that the parts beneath the plate are not readily visible, and serving to cause the inner surface of the plate to be in direct communication with the atmosphere.

2. In a thermostat: a member made from heat insulating material and adapted to be supported by the aid of a wall; a plate overlying said member and made from material having good heat-conducting properties; a condition-controlling temperature responsive element mounted on said plate and between the member and the plate; said plate having an edge inwardly directed toward said member and spaced therefrom, the space between the edge and the member forming a continuous opening clear around said edge; and means forming small contact areas spaced inwardly from said edge for maintaining said plate in said spaced relation; the edges of the member being extended beyond the edge of the plate; said plate and said member forming a casing for the accommodation of the temperature responsive element; the space between the edge of the plate and the member being small so that the parts beneath the plate are not readily visible, and serving to cause the inner surface of the plate to be in direct communication with the atmosphere.

3. In a thermostat: a member made from heat insulating material and adapted to be supported by the aid of a wall; a plate overlying said member and made from material having good heat-conducting properties; a condition-controlling temperature responsive element mounted on said plate and between the member and the plate; manually operable means extending outwardly of said plate for controlling said temperature responsive element; said plate having an imperforate edge inwardly directed toward said member and spaced therefrom, the space between the edge and the member forming a continuous opening clear around said edge; and means forming small contact areas spaced inwardly from said edge for maintaining said plate in said spaced relation; said plate and said member forming a casing for the accommodation of the temperature responsive element; the space between the edge of the plate and the member being small so that the parts beneath the plate are not readily visible, and serving to cause the inner surface of the plate to be in direct communication with the atmosphere.

4. In a thermostat: a member made from heat insulating material and adapted to be supported by the aid of a wall; a plate overlying said member and made from material having good heat-conducting properties; a condition-controlling temperature responsive element mounted on said plate and between the member and the plate; manually operable means mounted on and extending outwardly of said plate for controlling said temperature responsive element; said plate having an imperforate edge inwardly directed toward said member and spaced therefrom, the space between the edge and the member forming a continuous opening clear around said edge; means forming small contact areas spaced inwardly from said edge for maintaining said plate in said spaced relation; and a protective cover of material having good heat conducting properties and enclosing said temperature responsive element; said plate and said member forming a casing for the accommodation of the temperature responsive element and said cover; the space between the edge of the plate and the member being so small that the parts beneath the plate are not readily visible, and serving to cause the inner surface of the plate and the outer surface of the cover to be in direct communication with the atmosphere.

WILLIAM A. RAY.